Feb. 17, 1925.
V. G. APPLE
NUTCRACKER
Filed Dec. 9, 1922
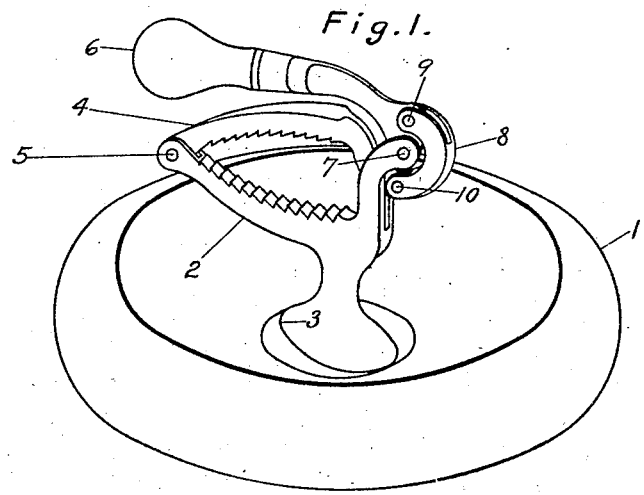
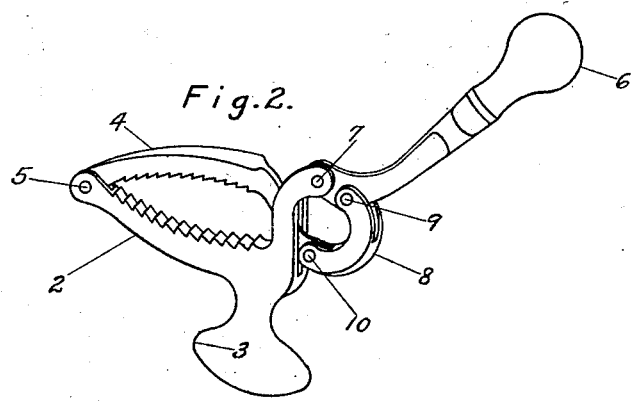
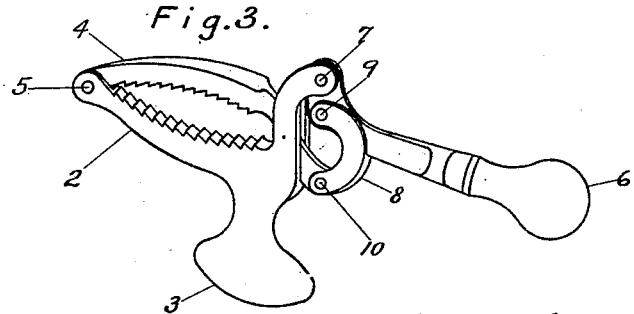
INVENTOR
Vincent G. Apple
BY
ATTORNEYS.

Patented Feb. 17, 1925.

1,526,656

UNITED STATES PATENT OFFICE.

VINCENT G. APPLE, OF DAYTON, OHIO.

NUTCRACKER.

Application filed December 9, 1922. Serial No. 605,846.

*To all whom it may concern:*

Be it known that I, VINCENT G. APPLE, a citizen of the United States, residing at Dayton, in the county of Montgomery and State of Ohio, have invented new and useful Improvements in Nutcrackers, of which the following is a specification.

This invention relates to improvements in nut crackers which consist of a receptacle for holding the nuts in conjunction with a hand operated mechanism for cracking them, the object of the improvements being to provide a simple device of pleasing appearance having great crushing force from the application of very little hand pressure.

I attain this object by the mechanism illustrated in the accompanying drawing, in which—

Fig. 1 is a view of the device as it appears when not in use, Fig. 2 a view of the device with the lever brought to proper position for inserting a nut and Fig. 3 a view of the device in the position it assumes after the nut is cracked, the bowl having been omitted in Figs. 2 and 3.

Similar numerals refer to similar parts throughout the several views.

In Fig. 1 the device is shown as it appears when not in use, with the handle folded horizontally across the top of the jaws and consists of a storage bowl 1, a stationary jaw 2 fastened to the bowl at its base 3 by screws coming through the bottom of the bowl, a movable jaw 4 hinged on stationary jaw 2, as at 5, an operating handle 6 hinged on stationary jaw 2, as at 7, and a link 8 hinged on operating handle 6, as at 9, and on movable jaw 4, as at 10.

The operation is accomplished substantially as follows:

The operating handle 6 is moved to approximately the position shown in Fig. 2. A nut is now placed between the jaws 2 and 4 and moved toward hinge 5 until it fits closely between the jaws. The operating handle 6 is now pressed downward until it reaches the position shown in Fig. 3 whereby the movable jaw 4 is brought downward to crush the nut. It will be seen that as the travel of the hinge pin 9 is along the circumference of a circle, it requires considerable movement of the handle 6 to perform a much shorter travel of the movable jaw 4, thus greatly multiplying the leverage and lessening the pressure required on the operating handle 6.

It is obvious that with the arrangement shown the greatest pressure is produced on the nut when the handle is near the lowest point of its travel as the linkage then assumes a position in which the pivotal points thereof are nearest in a straight line, as in a toggle joint, and the arrangement of the parts is such that the pressure required on the handle is slight and being downward obviates the necessity of a means for fastening the device to a table or other object to prevent its movement when in use.

Having described my invention what I claim is:

1. The combination in a nut cracking device of a base, a horizontally disposed serrated jaw member rigidly affixed thereto, another horizontally disposed serrated jaw member above the first jaw member hinged at one end thereof, the free ends of the jaw members extending the lower fixed member upward and the upper hinged member downward to considerably overlap, a link hinged to the free end of the upper jaw member, a link hinged to the free end of the lower jaw member, the free ends of the links hinged together, a handle extending from one link at such an angle that the three hinged points of the links may be thereby brought into a substantially straight line to provide great pressure on the jaws by a relatively small pressure on the handle as in a toggle joint, the linkage and handle being in such arrangement relative to the base that said pressure on the handle will be downward toward said base, thus making the device self supporting.

2. The combination in a nut cracking device of a storage bowl, a horizontally disposed serrated jaw member rigidly affixed thereto, another horizontally disposed serrated jaw member above the first jaw member hinged at one end thereof, the free ends of the jaw members extending the lower fixed member upward and the upper hinged member downward to considerably overlap, a link hinged to the free end of the upper jaw member, a link hinged to the free end of the lower jaw member, the free ends of the links hinged together, a handle extending from one link at such an angle that the three hinged points of the links may be thereby brought into a substantially straight line to provide great pressure on the jaws by a relatively small pressure on the handle as in a toggle joint, the linkage and handle being in such arrangement relative to the base of the storage bowl that said pressure on the handle will be downward toward said base, thus making the device self-supporting.

In testimony whereof I hereunto set my hand this 6th day of Dec., 1922.

VINCENT G. APPLE.